US009732810B2

(12) United States Patent
Sakamoto

(10) Patent No.: US 9,732,810 B2
(45) Date of Patent: Aug. 15, 2017

(54) CLUTCH CONTROL DEVICE

(71) Applicant: HONDA MOTOR CO., LTD., Tokyo (JP)

(72) Inventor: Naoki Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 218 days.

(21) Appl. No.: 14/825,763

(22) Filed: Aug. 13, 2015

(65) Prior Publication Data

US 2016/0053833 A1 Feb. 25, 2016

(30) Foreign Application Priority Data

Aug. 25, 2014 (JP) .................. 2014-170275

(51) Int. Cl.
*F16H 45/02* (2006.01)
*F16H 59/00* (2006.01)
*F16D 48/06* (2006.01)
*F16H 61/70* (2006.01)

(52) U.S. Cl.
CPC ........... *F16D 48/06* (2013.01); *F16H 61/702* (2013.01); *F16D 2500/10412* (2013.01); *F16D 2500/3111* (2013.01); *F16D 2500/3166* (2013.01); *F16D 2500/50209* (2013.01); *F16D 2500/50287* (2013.01); *F16D 2500/7044* (2013.01); *F16D 2500/70494* (2013.01); *F16D 2500/70668* (2013.01); *F16H 2710/04* (2013.01)

(58) Field of Classification Search
CPC ....... F16H 59/44; F16H 59/14; F16H 61/0021
USPC ..................... 74/335; 477/86, 196
See application file for complete search history.

(56) References Cited

U.S. PATENT DOCUMENTS

| | | | | |
|---|---|---|---|---|
| 7,294,092 B2* | 11/2007 | Walker | .................. | B60W 10/11 477/107 |
| 7,361,121 B2* | 4/2008 | Shizume | ............... | F16D 48/066 192/109 F |
| 7,503,877 B2* | 3/2009 | Tamai | ................. | F02D 41/0205 477/169 |
| 8,589,042 B2* | 11/2013 | Williams | ................ | F16D 48/06 477/169 |
| 9,031,752 B2* | 5/2015 | Yamawaki | ............ | F16H 61/143 477/169 |

FOREIGN PATENT DOCUMENTS

JP      2000-337490      12/2000

* cited by examiner

*Primary Examiner* — Ha D Ho
(74) *Attorney, Agent, or Firm* — Rankin, Hill & Clark LLP

(57) ABSTRACT

To allow a rider to sense torque in a low-speed traveling mode, a control device has a forward-and-reverse clutch oil pressure controller. In a low-speed traveling mode, the forward-and-reverse clutch oil pressure controller performs hunting control on driving torque, which is transmitted to a rear wheel from a crankshaft of an engine through a clutch device, a transmission, and a drive shaft, if vehicle speed stays within a second vehicle speed range for a predetermined time.

6 Claims, 12 Drawing Sheets

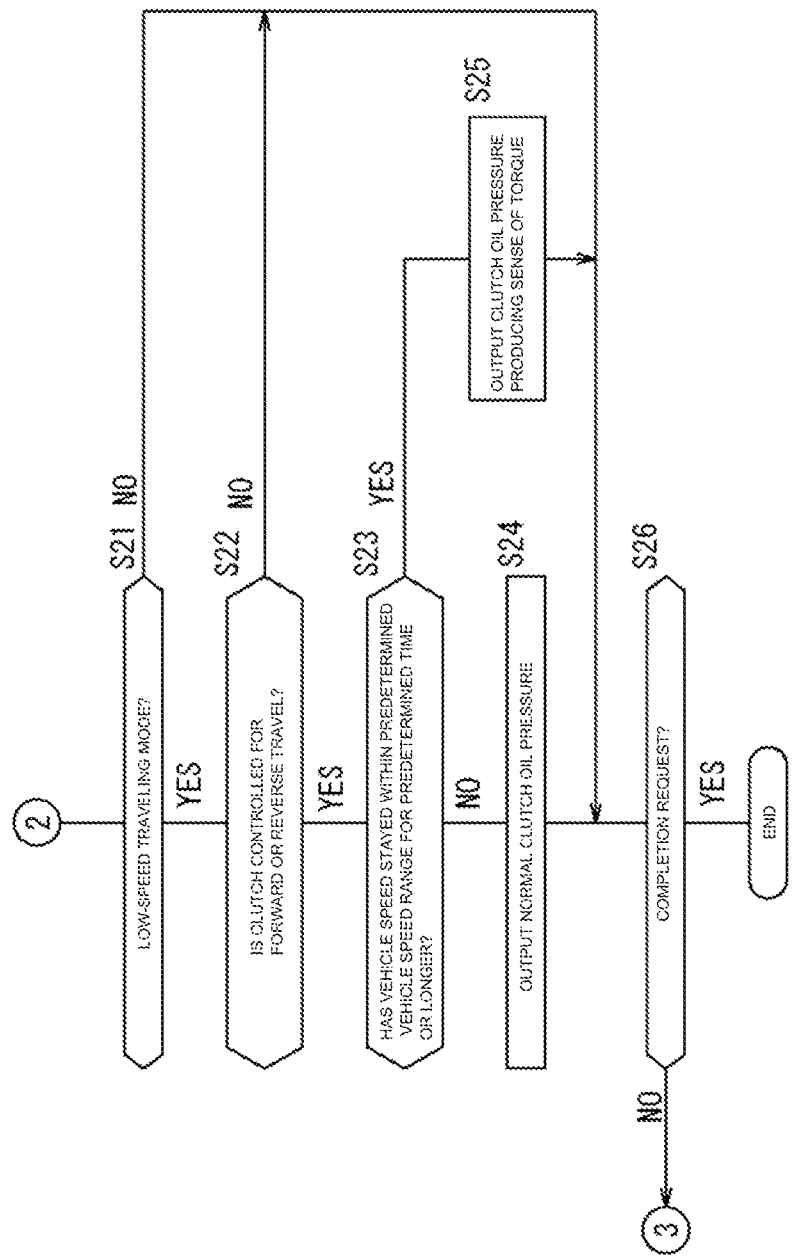

CLUTCH CONTROL DEVICE

BACKGROUND OF THE INVENTION

Field of the Invention

The present invention relates to a clutch control device for controlling connection and disconnection of a clutch, to move a vehicle forward and rearward.

Description of Related Art

For example, Japanese Patent Application Publication No. 2000-337490 discloses a technique for performing control to maintain vehicle speed within a constant range in a low-speed traveling mode, by connecting a forward clutch or a reverse clutch.

In a normal running state of a vehicle, a rider can sense torque easily, since driving torque (output torque), which is transmitted to a wheel from an engine through a clutch and a transmission, varies according to rotation of the engine.

Meanwhile, in a low-speed traveling mode, pressure of oil fed to the clutch is reduced, since the vehicle runs at low speed during its forward or reverse movement. As a result, it is difficult for the rider to feel variation in driving torque. This leads to a problem that the rider feels strange, since he/she is less likely to sense torque in the low-speed traveling mode even though the engine is rotating, as compared to the normal running state.

SUMMARY OF THE INVENTION

Against this background, the present invention aims to provide a clutch control device that allows a rider to sense torque in a low-speed traveling mode.

A clutch control device according to the present invention is applied to a vehicle including: a transmission having multiple gear trains between an input-side main shaft and an output-side counter shaft; a clutch connecting and disconnecting power transmission between the transmission and an engine; and a controller controlling connection and disconnection of the clutch, and has, among others, the following characteristics.

In accordance with a first characteristic, the controller includes a low-speed traveling mode for performing control to maintain vehicle speed of the vehicle at a target vehicle speed, and controls the clutch so that hunting, in which output torque outputted to the transmission from the clutch increases and decreases for a minute amount repeatedly, is performed during the low-speed traveling mode.

According to the first characteristic of the present invention, in the low-speed traveling mode, hunting is caused in output torque outputted to the transmission from the engine through the clutch. Hence, a sense of torque can be produced during the low-speed traveling mode, and the rider is allowed to sense torque.

In accordance with a second characteristic of the invention, a control amount of the clutch is a target oil pressure; and the controller causes hunting in the output torque by adding a correction value to the target oil pressure at constant intervals.

According to the second characteristic of the present invention, since the target oil pressure itself does not vary, the oil pressure correction value is added to the target oil pressure at constant intervals, so that periodical variation can be produced in the output torque.

In accordance with a third characteristic of the invention, the correction value is set to an amount that does not affect the vehicle speed, even when hunting is caused in the output torque.

According to the third characteristic of the present invention, since hunting control performed on output torque does not affect vehicle speed, the rider is allowed to sense torque, while the vehicle speed can be kept constant.

In accordance with a fourth characteristic of the invention, the controller causes hunting in the output torque, if the vehicle speed stays within a predetermined vehicle speed range for a predetermined time period.

According to the fourth characteristic of the present invention, hunting control is performed on output torque if vehicle speed stays within the predetermined vehicle speed range for the predetermined time period. Hence, a sense of torque can be produced stably without frequently switching to and from the hunting control.

BRIEF DESCRIPTION OF THE DRAWINGS

These and further features of the invention will be apparent with reference to the following description and drawings, wherein:

FIG. 9 is a flow chart (No. 3) showing a processing operation of the control device in the low-speed traveling mode;

DETAILED DESCRIPTION OF THE INVENTION

Hereinafter, a description will be given with reference to FIGS. 1 to 12, of a preferable embodiment example where a clutch control device of the present invention is applied to a motorcycle, which is a vehicle.

Figure 1:
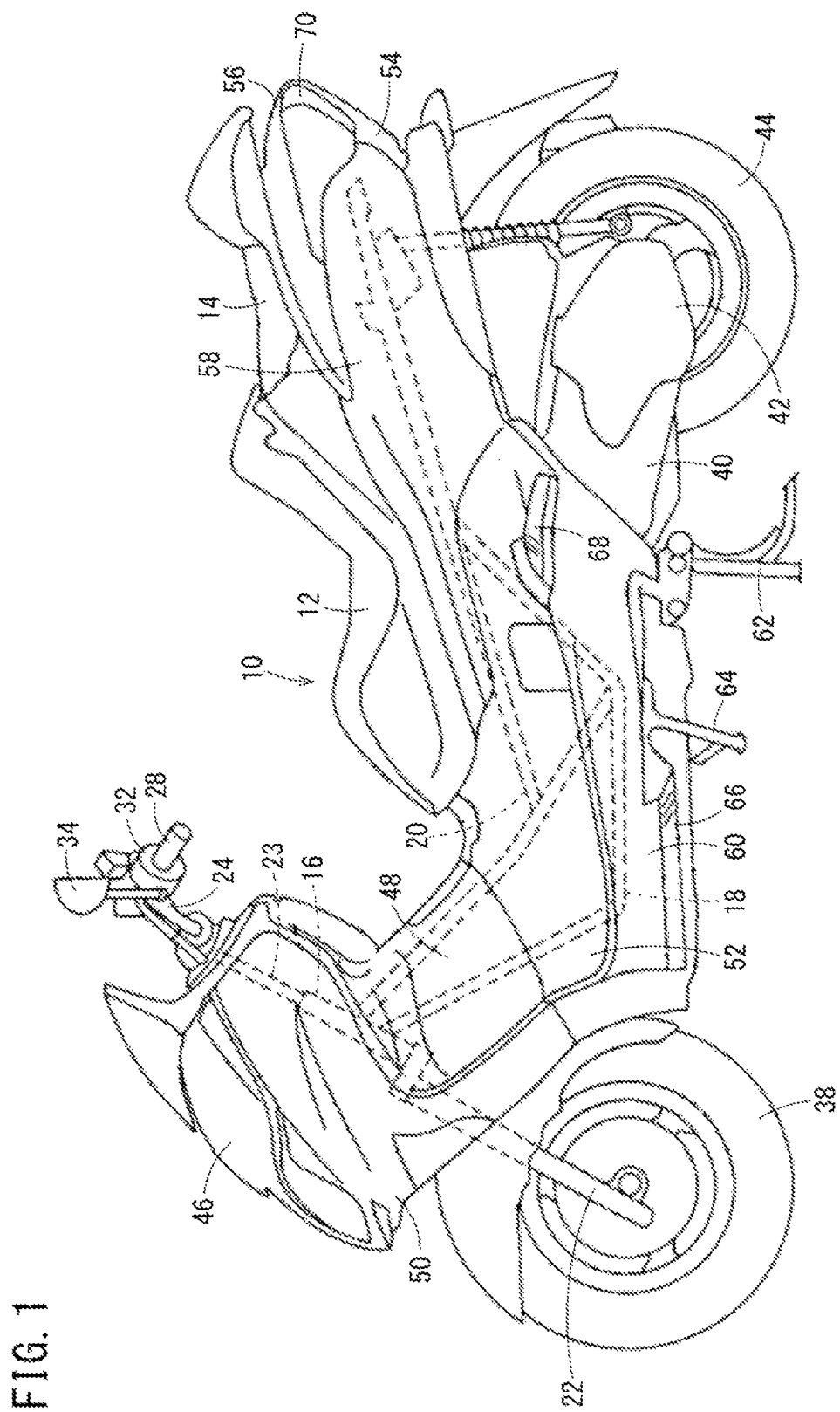
FIG. 1 is a left side view of an example of a motorcycle.
Figure 2:
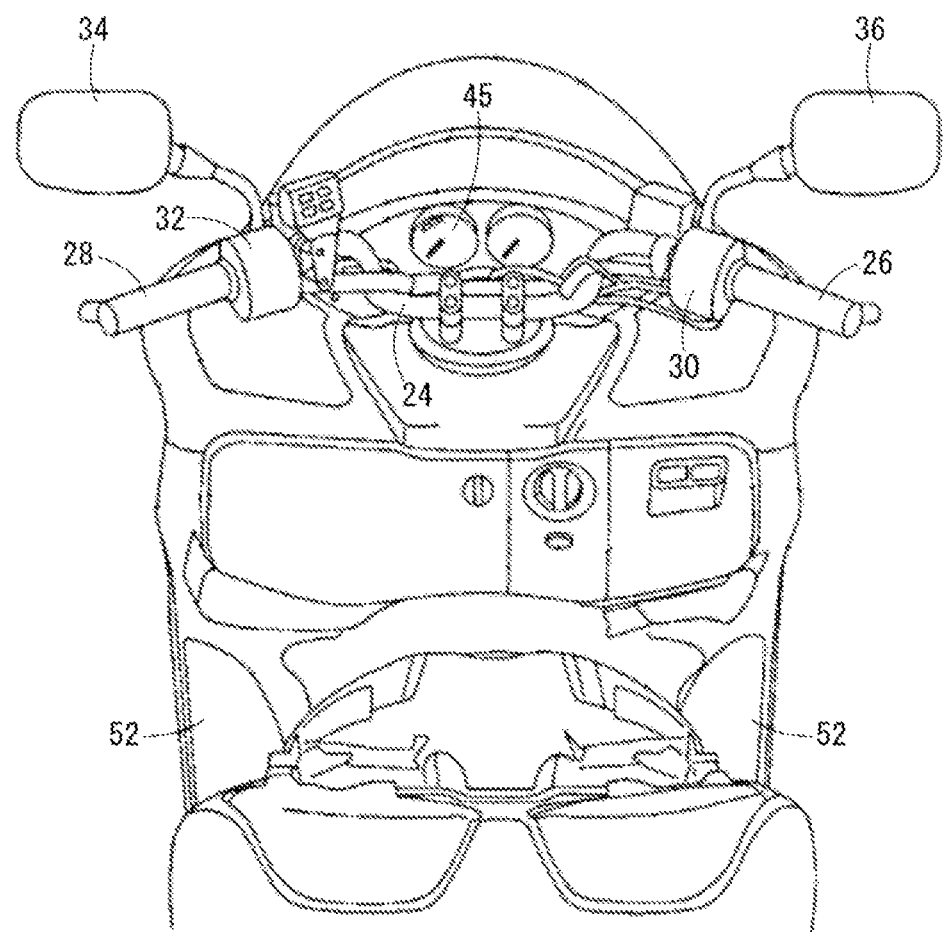
FIG. 2 is a plan view of the periphery of a handle of the motorcycle as seen from above.

As shown in FIGS. 1 and 2, a motorcycle 10 is a tandem vehicle (front-rear two seated vehicle) including a rider's seat 12 and a passenger's seat 14. The rider's seat 12 and the passenger's seat 14 include an unillustrated seat lock that is unlocked by remote control.

A body frame of the motorcycle 10 includes a head pipe 16, a down tube 18 extending in the lower rear direction from the head pipe 16, and a main tube 20 extending further in the rear upper direction from the down tube 18.

A front fork 22 is attached to the head pipe 16, in such a manner as to be steerable by a handle shaft 23. A handle bar 24, which extends to the left and right of the vehicle body, is attached to an upper portion of the handle shaft 23. The handle bar 24 has a right grip 26 provided on a right end portion thereof, and a left grip 28 provided on a left end portion thereof. Additionally, the handle bar 24 has a right switch case 30 arranged adjacent to the right grip 26, and a left switch case 32 arranged adjacent to the left grip 28. Further, a left mirror 34 and a right mirror 36 are attached to the handle bar 24. A front wheel 38 is pivotally supported to the lower end of the front fork 22.

A later-mentioned engine 100 (see FIG. 4) is suspended from the main tube 20, which constitutes the body frame, and output (output torque, driving torque) of the engine 100 is transmitted to a rear wheel 44 as a drive wheel through a transmission 40 and a reducer 42. Note that a gauge 45 and the like are arranged around the handle bar 24.

A vehicle body is covered with a front cover 46, a leg shield 48, a front side cover 50, a floor center cover 52, a rear side cover 54, a rear center cover 56, a body side cover 58, and a floor side cover 60. The vehicle body is capable of supporting itself with a main stand 62 and a side stand 64.

A rider's step 66 is provided in the floor side cover 60 on both sides of the vehicle body. Also, a passenger's step 68 is provided so as to project to the left and right from the main tube 20. A tail lamp unit 70 is provided between the rear center cover 56 and the rear side cover 54. In this case, the tail lamp unit 70 accommodates a position lamp, a stop lamp, a winker lamp, and the like.

Figure 3:
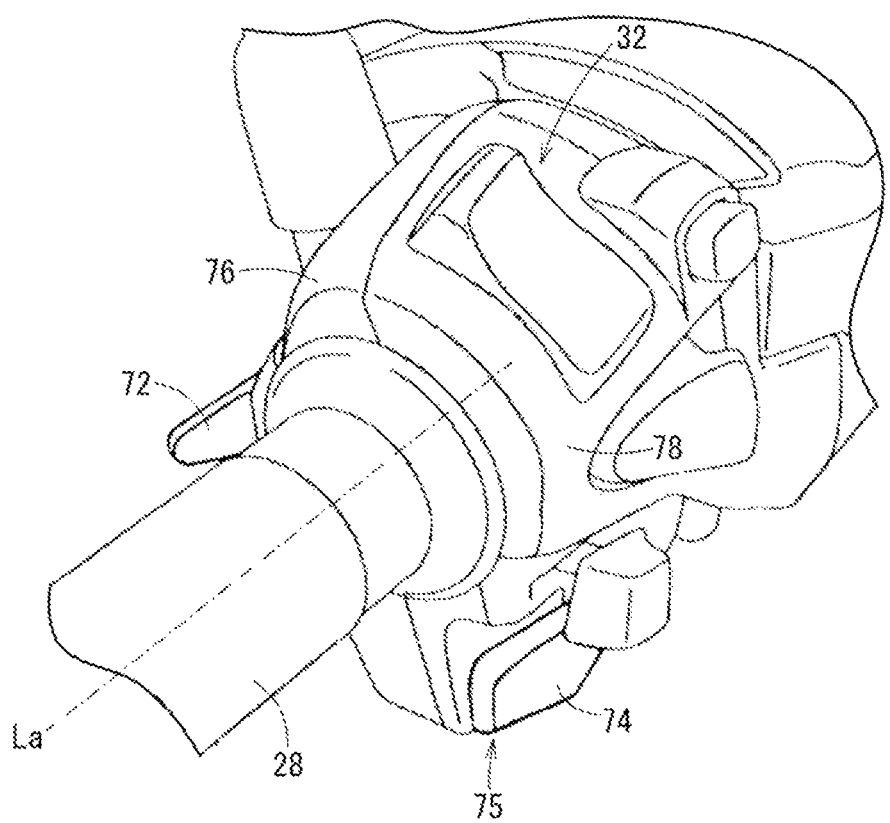
FIG. 3 is a perspective view of a left switch case, in which a shift down switch (forward switch) and a shift up switch (reverse switch) are installed.

In the embodiment, as shown in FIG. 3, a handle switch 75, which has at least a shift up switch 72 and a shift down switch 74, is provided in the left switch case 32.

Specifically, the left switch case 32 includes a two-piece-divided front housing portion 76 and rear housing portion 78, and is attached to the motorcycle 10, such that the front housing portion 76 and the rear housing portion 78 sandwich the vicinity of the left grip 28 of the handle bar 24 from the front and rear. In other words, the front housing portion 76 is installed on the front side and the rear housing portion 78 is installed on the rear side, with an axis La of the handle interposed therebetween. The rear housing portion 78 faces the rider's side.

The shift up switch 72 is installed in the front housing portion 76, and the shift down switch 74 is installed in the rear housing portion 78. That is, the shift up switch 72 is arranged in a position suitable for the rider gripping the left grip 28 with the left hand to operate mainly with the index finger, and the shift down switch 74 is arranged in a position suitable for the rider to operate mainly with the thumb. The shift up switch 72 and the shift down switch 74 are preferably arranged in positions where they are operable by the rider at the same time.

Also in the embodiment, in addition to a normal traveling mode, a low-speed traveling mode can be carried out where the rider walks and pushes the motorcycle 10 forward or rearward to park the vehicle, for example. Here, the low-speed traveling mode refers not to a mode where only reverse travel is possible, but to a mode where reverse travel as well as forward travel is possible.

The vehicle transitions to the low-speed traveling mode when the shift up switch 72 and the shift down switch 74 are operated at the same time, under a predetermined condition (low-speed traveling mode transitioning condition) set in advance.

The vehicle moves forward when the shift down switch 74 is operated during the low-speed traveling mode. Operation of the shift down switch 74 intuitively reminds the rider of forward travel because it is a frontward pushing motion by the thumb, for example, and thus can effectively prevent erroneous operation. Accordingly, the shift down switch 74 is sometimes referred to as a forward switch 74 in the following description.

Similarly, the vehicle moves rearward when the shift up switch 72 is operated during the low-speed traveling mode. Operation of the shift up switch 72 intuitively reminds the rider of reverse travel because it is a rearward pushing motion by the index finger, for example, and thus can effectively prevent erroneous operation. Accordingly, the shift up switch 72 is sometimes referred to as a reverse switch 72 in the following description.

Note that the vehicle transitions to the normal traveling mode when the shift up switch 72 and the shift down switch 74 are operated at the same time, under a predetermined condition (normal traveling mode transitioning condition) set in advance.

In other words, a combination of the shift up switch 72 and the shift down switch 74 constitutes a low-speed traveling mode setting input portion 80 (see FIG. 4), which allows the motorcycle 10 to be driven reversely.

Here, a description is given mainly of the low-speed traveling mode with reference to FIGS. 4 to 11.

Figure 4:
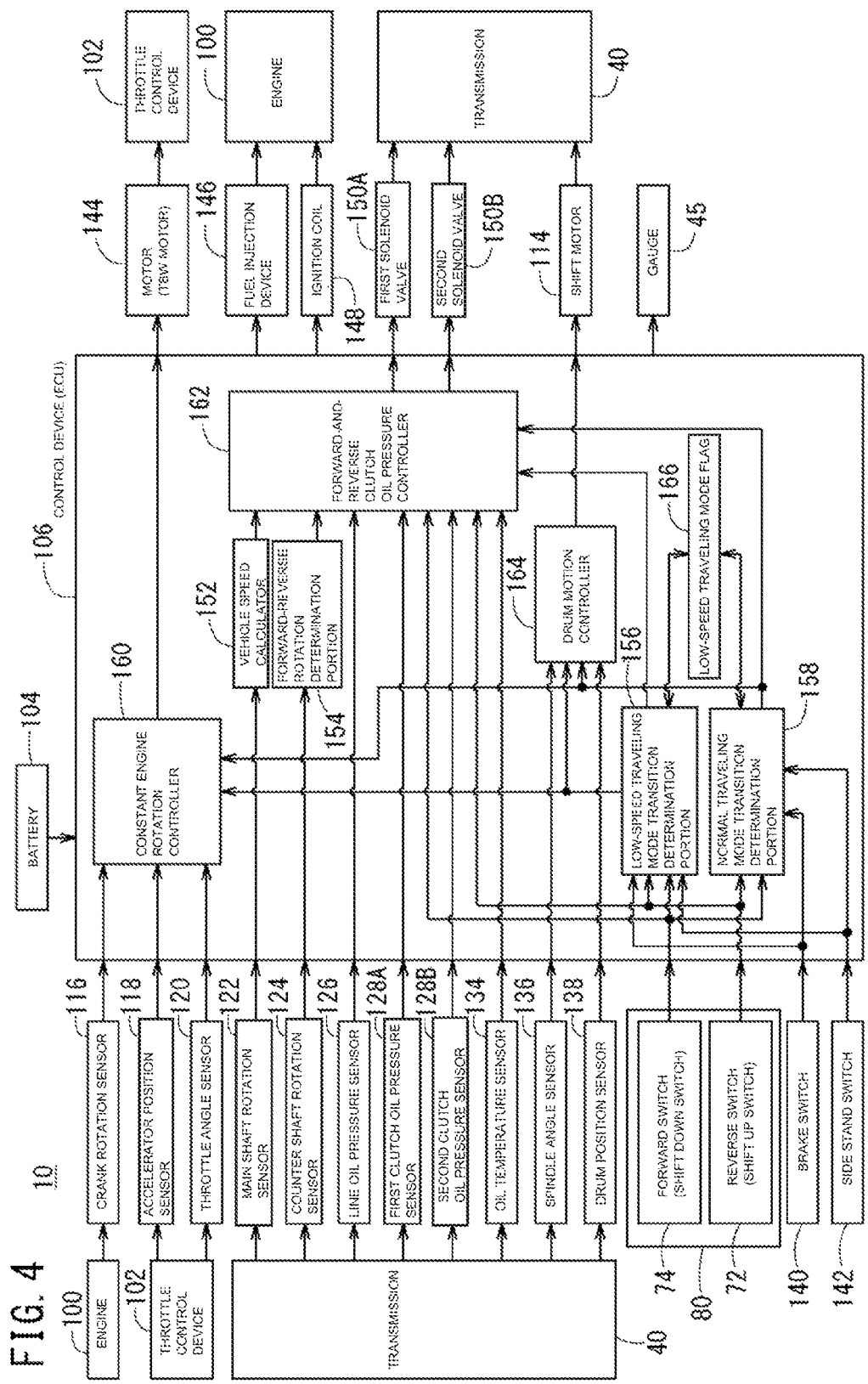
FIG. 4 is a block diagram of a main part of a control system, of a motorcycle including a control device according to the embodiment.

FIG. 4 is a block diagram of a main part of a control system, of the motorcycle 10 including a control device 106 as a clutch control device according to the embodiment.

Firstly, the motorcycle 10 has the engine 100 rotating a crankshaft, a throttle control device 102 (throttle by wire: TBW) electronically controlling a throttle, a transmission 40 transmitting output torque of the crankshaft to a drive shaft, and the control device 106 (ECU) controlling the motorcycle 10 by receiving electric power from a battery 104.

Figure 5:
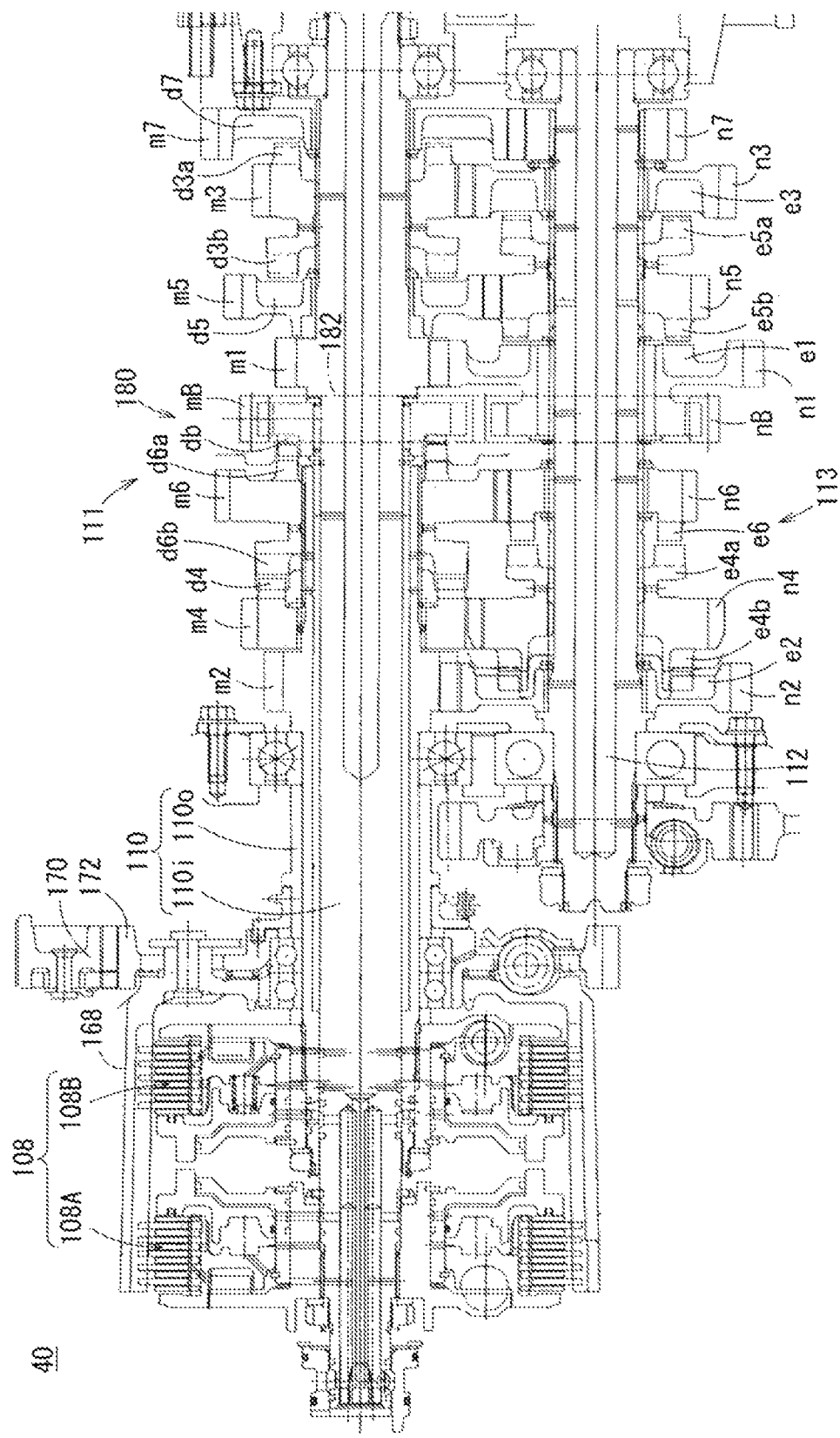
FIG. 5 is a configuration diagram of a drivetrain of a transmission.

As shown in FIG. 5, the transmission 40 has a clutch device 108. A hydraulic dual clutch device having a first clutch 108A and a second clutch 108B is preferably employed as the clutch device 108, for example. Details thereof will be described later.

In addition, the transmission 40 has a main shaft 110 and counter shaft 112 arranged parallel to the crankshaft, an unillustrated shift spindle rotated by a shift motor 114 (see FIG. 4), and an unillustrated shift drum that links drive force, by selectively dog-engaging transmission gears according to the rotation angle of the shift spindle. Although the counter shaft 112 normally rotates in one direction (rotation for forward travel), it also rotates reversely (rotation for reverse travel) in this embodiment. Details will be described later.

A drive gear train (gear train) 111 configured of drive gears m1 to m7 for seven speeds, for example, is provided in the main shaft 110, and a driven gear train (gear train) 113 configured of driven gears n1 to n7 for seven speeds is provided in the counter shaft 112. Corresponding speeds of the drive gears m1 to m7 and driven gears n1 to n7 mesh with each other, and each constitutes a transmission gear pair corresponding to each speed.

As shown in FIG. 4, various sensors are attached to the aforementioned engine 100, throttle control device 102, and transmission 40.

For example, a crank rotation sensor 116 for detecting the revolution speed of the crankshaft is attached to the engine 100, while an accelerator position sensor 118 for detecting a throttle rotation angle (accelerator position) of the right grip 26, and a throttle angle sensor 120 for detecting an opening angle (throttle opening angle) of a throttle valve of the engine 100 are attached to the throttle control device 102.

The transmission 40 has a main shaft rotation sensor 122 and counter shaft rotation sensor 124 for detecting the revolution speed of the main shaft 110 and counter shaft 112, a line oil pressure sensor 126 for detecting oil pressure of a hydraulic pathway to the clutch device 108, a first clutch oil pressure sensor 128A for detecting oil pressure of the first clutch 108A, a second clutch oil pressure sensor 128B for detecting oil pressure of the second clutch 108B, an oil temperature sensor 134 for detecting the temperature of oil 132 inside an oil pan 130 (see FIG. 6), a spindle angle sensor 136 for detecting the rotation angle of the shift spindle, and a drum position sensor 138 for detecting the position of the shift drum.

Detection signals of the aforementioned various sensors are inputted to the control device 106. In addition to these detection signals, the control device 106 receives input of signals from the shift up switch 72, the shift down switch 74, a brake switch 140, and a side stand switch 142.

For example, each of the shift up switch 72 and the shift down switch 74 outputs an ON signal while the switch is being operated, and outputs an OFF signal when it is not operated. The brake switch 140 also outputs an ON signal while a brake lever is being operated, and outputs an OFF signal when it is not operated. The side stand switch 142 outputs an ON signal while the side stand 64 (see FIG. 1) is brought out, for example, and outputs an OFF signal when the side stand is retracted.

Based on detection signals from various sensors and signals from various switches, the control device 106 controls a motor 144 (TBW motor) of the throttle control device 102, a fuel injection device 146 and ignition coil 148 of the engine 100, the shift motor 114 of the transmission 40, a first solenoid valve 150A for controlling oil pressure of the first clutch 108A, and a second solenoid valve 150B for controlling oil pressure of the second clutch 108B. Furthermore, the control device 106 outputs the result of calculation performed therein, to the gauge 45. The gauge 45 outputs the inputted calculation result in analogue display (display with an indicator needle), digital display, lamp display, and the like.

Moreover, the control device 106 has a determination portion and a controller for achieving the aforementioned low-speed traveling mode.

To be specific, the control device has a vehicle speed calculator 152, a forward-reverse rotation determination portion 154, a low-speed traveling mode transition determination portion 156, a normal traveling mode transition determination portion 158, a constant engine rotation controller 160, a forward-and-reverse clutch oil pressure controller 162, a drum motion controller 164, and the like.

The vehicle speed calculator 152 calculates vehicle speed on the basis of a detection signal from the main shaft rotation sensor 122. The forward-reverse rotation determination portion 154 determines whether the vehicle is moving forward or rearward, on the basis of a detection signal from the counter shaft rotation sensor 124.

The low-speed traveling mode transition determination portion 156 determines whether or not to transition to the low-speed traveling mode, on the basis of signals from various sensors and switches. In a case where the vehicle transitions to the low-speed traveling mode, a low-speed traveling mode flag 166 is set to "1," for example. The normal traveling mode transition determination portion 158 determines whether or not to transition to the normal traveling mode, on the basis of signals from various sensors and switches. In a case where the vehicle transitions to the normal traveling mode, the "1" in the low-speed traveling mode flag 166 is reset to "0."

The constant engine rotation controller 160 disables the rider's operation of the throttle of the right grip 26, and performs control to keep the engine speed and throttle opening angle constant. For instance, the constant engine rotation controller performs control to maintain an idle state.

The forward-and-reverse clutch oil pressure controller 162 functions as a controller for controlling connection and disconnection of the first clutch 108A and the second clutch 108B, and performs brake control for stopping, clutch oil pressure control for forward travel, as well as clutch oil pressure control for reverse travel, on the basis of vehicle speed information from the vehicle speed calculator 152, a determination result from the forward-reverse rotation determination portion 154, and detection signals from the oil pressure sensors (126, 128A, 128B) and oil temperature sensor 134.

The drum motion controller 164 drives the shift motor 114, so that the position of the shift drum is moved to a preset low-speed traveling mode position when transitioning to the low-speed traveling mode from the normal traveling mode. The drum motion controller also drives the shift motor 114, so that the position of the shift drum is moved to a neutral position when transitioning to the normal traveling mode from the low-speed traveling mode. Feedback control is performed on the movement of the shift motor 114, according to detection signals from the spindle angle sensor 136 and the drum position sensor 138.

Here, a configuration and operation of the clutch device 108, main shaft 110, and counter shaft 112 of the transmission 40 will be described with reference to FIG. 5.

The clutch device 108 has a hydraulic odd step-side disc clutch (first clutch 108A) and even step-side disc clutch (second clutch 108B), which are arranged coaxially and adjacent to each other. The main shaft 110 has an inner shaft 110$i$ and an outer shaft 110$o$, and the inner shaft 110$i$ and the outer shaft 110$o$ are provided coaxially. The first clutch 108A is provided on one end portion of the inner shaft 110$i$, and the second clutch 108B is provided on one end portion of the outer shaft 110$o$.

A main-side driven gear 172 that meshes with a crank-side drive gear 170 of the crankshaft is provided coaxially on a clutch outer 168, which is shared by the first clutch 108A and the second clutch 108B. Rotary drive force (output torque, driving torque) from the crankshaft is inputted to the clutch outer 168 through the crank-side drive gear 170 and the main-side driven gear 172. The rotary drive force inputted to the clutch outer 168 is transmitted to each of the inner shaft 110$i$ and the outer shaft 110$o$ as output torque (driving torque) from the engine 100, depending on the connection state of the first clutch 108A and the second clutch 108B.

Figure 6:
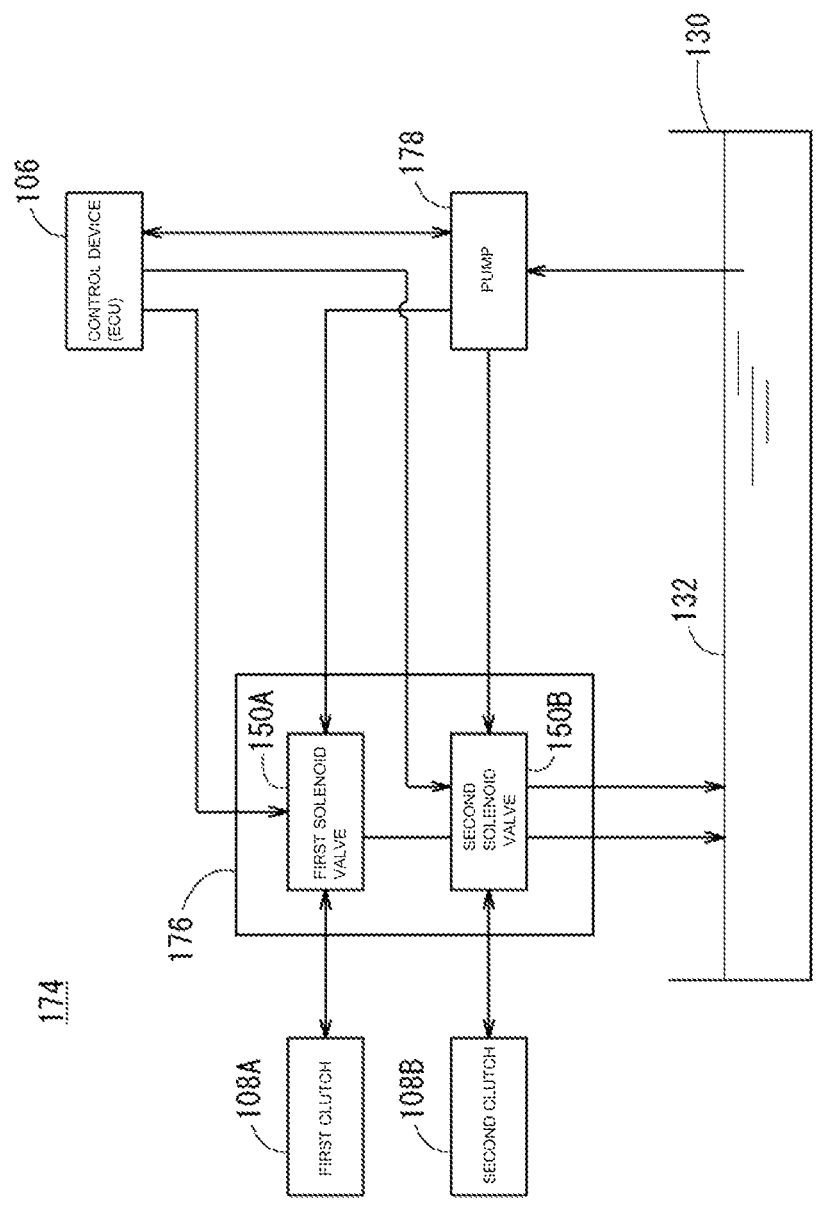
FIG. 6 is a block diagram of a configuration of an oil pressure-application system.

The connection state of the first clutch 108A and the second clutch 108B is controlled separately, according to whether or not oil pressure is applied by an oil pressure-application system 174 shown in FIG. 6.

As shown in FIG. 6, the oil pressure-application system 174 has a clutch control device 176, and an oil pump 178 that draws or sucks up and feeds the oil 132 in the oil pan 130 to the clutch device 108. The clutch control device 176 has the first solenoid valve 150A and the second solenoid valve 150B.

The first solenoid valve 150A controls oil pressure applied to the first clutch 108A, on the basis of an instruction from the control device 106. That is, application of oil pressure to the first clutch 108A connects the inner shaft 110*i* of the main shaft 110 and the crankshaft. In contrast, reduction in oil pressure applied to the first clutch 108A disconnects the inner shaft and the crankshaft.

The second solenoid valve 150B controls oil pressure applied to the second clutch 108B, on the basis of an instruction from the control device 106. That is, application of oil pressure to the second clutch 108B connects the outer shaft 110*o* of the main shaft 110 and the crankshaft. In contrast, reduction in oil pressure applied to the second clutch 108B disconnects the outer shaft and the crankshaft.

Normally, of the first clutch 108A and the second clutch 108B, one is connected while the other is disconnected. One of the transmission gear pairs connected to the inner shaft 110*i* and the outer shaft 110*o* is used for power transmission inside the transmission 40. The next transmission gear pair to be used is selected from among those connected to the inner shaft 110*i* and the outer shaft 110*o*, according to an operation of the shift up switch 72 or the shift down switch 74. With this selection, one of the first clutch 108A and second clutch 108B that had been connected is disconnected, and the other clutch that had been disconnected is connected. Thus, power transmission of the transmission 40 is switched to that using the selected transmission gear pair, so that the transmission 40 can be upshifted or downshifted.

To be specific, the first clutch 108A is connected in first gear, third gear, fifth gear, and seventh gear, while the second clutch 108B is connected in second gear, fourth gear, and sixth gear. In other words, in the clutch device 108, the first clutch 108A and the second clutch 108B are alternately connected and disconnected for each step to shift from first to seventh gear.

As shown in FIG. 5, the transmission 40 is a constant-mesh type transmission, where the drive gears m1 to m7 and driven gears n1 to n7 corresponding to the respective speeds are constantly meshed with each other.

The gears m1 to m7 and n1 to n7 are classified broadly into: a fixed gear capable of rotating integrally with its supporting shaft (main shaft 110, counter shaft 112); a free gear capable of rotating relative to the supporting shaft but incapable of moving in the axial direction; and a slide gear capable of rotating integrally with the supporting shaft and also capable of moving in the axial direction.

Specifically, the drive gears m1 and m2 are fixed gears, drive gears m3 and m6 are slide gears, and drive gears m4, m5 and m7 are free gears.

Additionally, the driven gear n7 is a fixed gear, driven gears n1 to n3 and n6 are free gears, and driven gears n4 and n5 are slide gears.

Note that each slide gear is spline-fitted to its supporting shaft.

To be specific, the gears on the inner shaft 110*i* are arranged in the order of the fixed gear m1, free gear m5, slide gear m3, and free gear m7, from the side close to the clutch device 108 to the side away from the clutch device, while on the counter shaft 112, the free gear n1, slide gear n5, free gear n3, and fixed gear n7 are arranged so as to correspond to the above-mentioned gears.

The gears on the outer shaft 110*o* are arranged in the order of the fixed gear m2, free gear m4, and slide gear m6, from the side close to the clutch device 108 to the side away from the clutch device, while on the counter shaft 112, the free gear n2, slide gear n4, and free gear n6 are arranged so as to correspond to the above-mentioned gears.

That is, the free gear on the counter shaft 112 meshes with the fixed or slide gear on the main shaft 110, while the slide or fixed gear of the counter shaft 112 meshes with the free gear on the main shaft 110.

Axially protruding dogs d3*a* and d3*b* are provided on both side faces of the drive gear m3. When the drive gear m3 slides in one axial direction (right side in FIG. 5: hereinafter referred to as the right side in the axial direction) from the neutral position, one dog d3*a* engages with a dog hole d7 in the drive gear m7. Similarly, when the drive gear m3 slides in the other axial direction (right side in FIG. 5: hereinafter referred to as the left side in the axial direction) from the neutral position, the other dog d3*b* engages with a dog hole d5 in the drive gear m5.

An axially protruding dog d4 is provided on one side face of the drive gear m4. Axially protruding dogs d6*a* and d6*b* are also provided on both side faces of the drive gear m6. When the drive gear m6 slides to the left side in the axial direction from the neutral position, the other dog d6*b* engages with the dog d4 on the drive gear m4.

Axially protruding dogs e5*a* and e5*b* are provided on both side faces of the driven gear n5. When the driven gear n5 slides to the right side in the axial direction from the neutral position, one dog e5*a* engages with a dog hole e3 in the driven gear n3. Similarly, when the driven gear n5 slides to the left side in the axial direction from the neutral position, the other dog e5*b* engages with a dog hole e1 in the driven gear n1.

An axially protruding dog e6 is provided on another side face of the driven gear n6. Axially protruding dogs e4*a* and e4*b* are also provided on both side faces of the driven gear n4. When the driven gear n4 slides to the right side in the axial direction from the neutral position, one dog e4*a* engages with the dog e6 on the driven gear n6. Similarly, when the driven gear n4 slides to the left side in the axial direction from the neutral position, the other dog e4*b* engages with a dog hole e2 in the driven gear n2.

Next, a description will be given of upshifting from first to seven gears from the neutral state, in the normal traveling mode where the inner shaft 110*i* is rotated by the first clutch 108A, for example. Every upshifting operation in the normal traveling mode is performed with the counter shaft 112 rotating in a direction opposite to the rotation direction of the main shaft 110, i.e., rotating in the normal direction. Rotary force of the normal rotation is transmitted to the unillustrated drive shaft, and moves the motorcycle 10 forward.

When the rotation angle of the shift spindle indicates the neutral state, each of the drive gears m3, m6 and the driven gears n4, n5 are in the neutral position, so that rotary force of the main shaft 110 is not transmitted to the counter shaft 112.

When the rotation angle of the shift spindle is changed from the neutral state to first gear, the driven gear n5 moves to the left side in the axial direction. With this, rotary force (output torque, driving torque) of the inner shaft 110*i* is transmitted to the counter shaft 112 through the drive gear m1, driven gear n1, and driven gear n5 in this order.

When the rotation angle of the shift spindle is changed from first gear to second gear, the first clutch 108A is disconnected to switch to the second clutch 108B for rotation of the outer shaft 110*o*, and the driven gear n4 moves to the left side in the axial direction. With this, rotary force (output torque, driving torque) of the outer shaft 110*o* is transmitted to the counter shaft 112 through the drive gear m2, driven gear n2, and driven gear n4 in this order.

When the rotation angle of the shift spindle is changed from second gear to third gear, the second clutch 108B is disconnected to switch to the first clutch 108A for rotation of the inner shaft 110*i*, and the driven gear n5 moves to the right side in the axial direction. With this, rotary force of the inner shaft 110*i* is transmitted to the counter shaft 112 through the drive gear m3, driven gear n3, and driven gear n5 in this order.

When the rotation angle of the shift spindle is changed from third gear to fourth gear, the first clutch 108A is disconnected to switch to the second clutch 108B for rotation of the outer shaft 110*o*, and the drive gear m6 moves to the left side in the axial direction. With this, rotary force of the outer shaft 110*o* is transmitted to the counter shaft 112 through the drive gear m6, drive gear m4, and driven gear n4 in this order.

When the rotation angle of the shift spindle is changed from fourth gear to fifth gear, the second clutch 108B is disconnected to switch to the first clutch 108A for rotation of the inner shaft 110*i*, and the drive gear m3 moves to the left side in the axial direction. With this, rotary force of the inner shaft 110*i* is transmitted to the counter shaft 112 through the drive gear m3, drive gear m5, and driven gear n5 in this order.

When the rotation angle of the shift spindle is changed from fifth gear to sixth gear, the first clutch 108A is disconnected to switch to the second clutch 108B for rotation of the outer shaft 110*o*, and the drive gear m6 returns to the neutral position while the driven gear n4 moves to the right side in the axial direction. With this, rotary force of the outer shaft 110*o* is transmitted to the counter shaft 112 through the drive gear m6, driven gear n6, and driven gear n4 in this order.

When the rotation angle of the shift spindle is changed from sixth gear to seventh gear, the second clutch 108B is disconnected to switch to the first clutch 108A for rotation of the inner shaft 110*i*, and the drive gear m3 moves to the right side in the axial direction. With this, rotary force of the inner shaft 110*i* is transmitted to the counter shaft 112 through the drive gear m3, drive gear m7, and driven gear n7 in this order.

Since downshifting operations are opposite to the above-mentioned upshifting operations, descriptions thereof are omitted. Note that every downshifting operation is also performed with the counter shaft 112 rotating in the normal direction.

Moreover, the embodiment includes a reverse gear train 180 for performing reverse travel. The reverse gear train 180 has a main shaft-side sprocket mB, which is a sprocket on the main shaft 110 side installed between the drive gear m1 of the inner shaft 110*i* and the drive gear m6 of the outer shaft 110*o*, and a counter shaft-side sprocket nB, which is a sprocket on the counter shaft 112 side installed between the driven gears n1 and n6 of the counter shaft 112. The main shaft-side sprocket mB is a free gear, while the counter shaft-side sprocket nB is a free gear provided integrally with the driven gear n1 and rotating with the driven gear n1. The main shaft-side sprocket mB and the counter shaft-side sprocket nB are rotated in the same direction by a reverse travel chain 182.

Further, when the rotation angle of the shift spindle is changed to a preset angle corresponding to the low-speed traveling mode, the position of the shift drum is set to a preset low-speed traveling mode position, the drive gear m6 slides to the right side in the axial direction from the neutral position, and the driven gear n4 slides to the left side in the axial direction from the neutral position. With this, one dog d6*a* on the drive gear m6 engages with a dog hole db in the main shaft-side sprocket mB, and the other dog e4*b* on the driven gear n4 engages with the dog hole e2 in the driven gear n2.

After transitioning to the low-speed traveling mode, a forward movement in the low-speed traveling mode is carried out by operating the forward switch 74. That is, the second clutch 108B is connected, and the first clutch 108A is disconnected. With this, rotary force of the crankshaft in the idle state is transmitted to the outer shaft 110*o* through the second clutch 108B. Accordingly, rotary force of the outer shaft 110*o* are transmitted to the counter shaft 112 through the drive gear m2, driven gear n2, and driven gear n4 in this order, and the counter shaft 112 rotates in the normal direction. Rotary force of the normal rotation is transmitted to the drive shaft and moves the motorcycle 10 forward. Note that although rotary force of the outer shaft 110*o* is transmitted to the inner shaft 110*i* through the drive gear m6, main shaft-side sprocket mB, reverse travel chain 182, counter shaft-side sprocket nB, driven gear n1, and drive gear m1 in this order, the inner shaft 110*i* only spins free since the odd gears are in the neutral state.

After transitioning to the low-speed traveling mode, a rearward movement in the low-speed traveling mode is carried out by operating the reverse switch 72. That is, the first clutch 108A is connected, and the second clutch 108B is disconnected. With this, rotary force of the crankshaft in the idle state is transmitted to the inner shaft 110*i* through the first clutch 108A. Accordingly, rotary force of the inner shaft 110*i* is transmitted to the outer shaft 110*o* through the drive gear m1, driven gear n1, counter shaft-side sprocket nB, reverse travel chain 182, main shaft-side sprocket mB, and drive gear m6 in this order. In this case, the outer shaft 110*o* rotates in a direction opposite to the rotation direction of the inner shaft 110*i*. Then, rotary force of the outer shaft 110*o* is transmitted to the counter shaft 112 through the drive gear m2, driven gear n2, and driven gear n4 in this order. In this case, the counter shaft 112 rotates in a direction opposite to the rotation direction of the outer shaft 110*o* (the same direction as the rotation of the inner shaft 110*i*), i.e., rotates in the reverse direction. Rotary force of the reverse rotation is transmitted to the drive shaft and moves the motorcycle 10 rearward.

Next, a description will be given of processing operations of the control device 106 in the low-speed traveling mode, with reference to the flowcharts in FIGS. 7 to 9.

Figure 7:
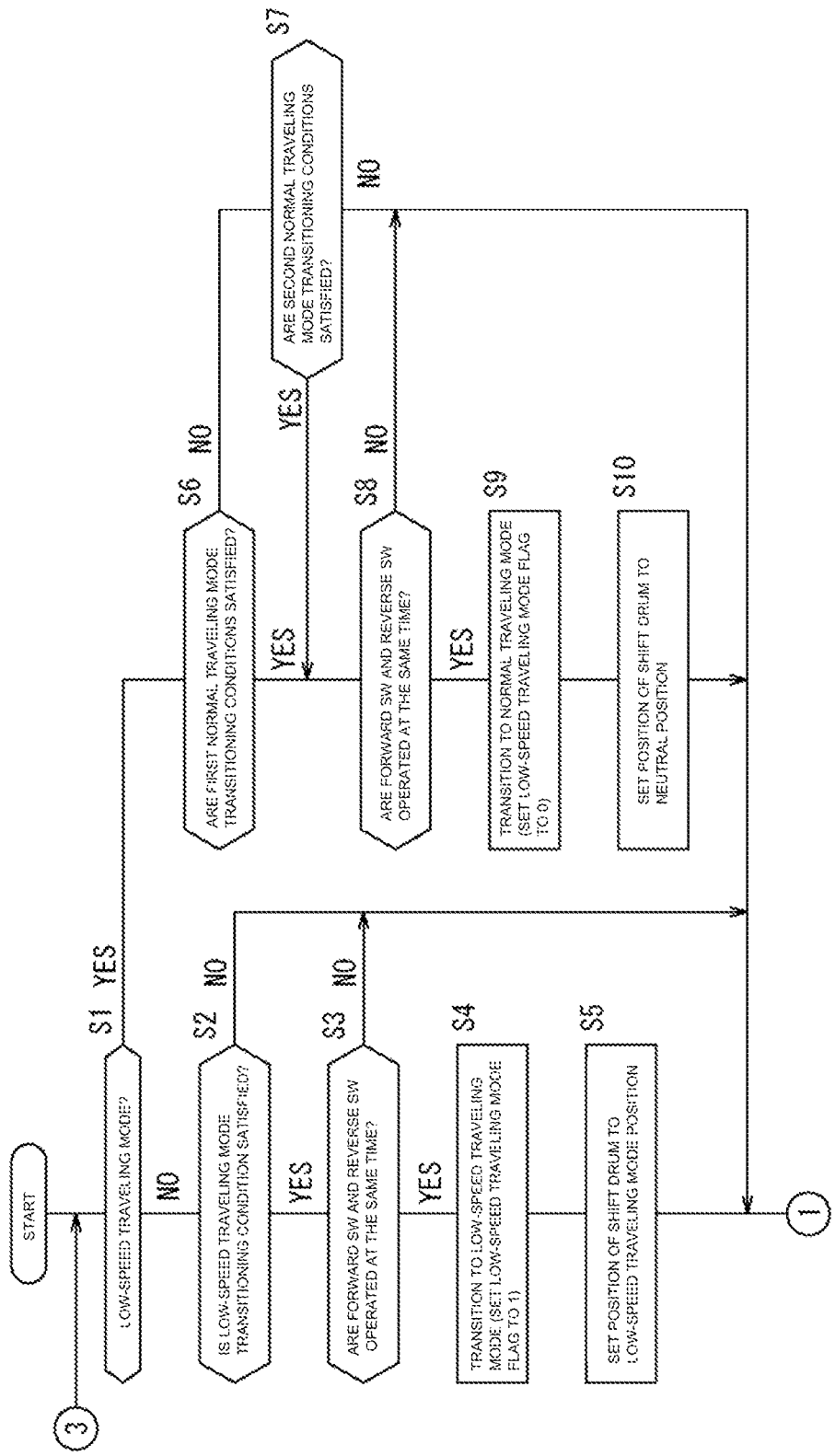
FIG. 7 is a flow chart (No. 1) showing a processing operation of the control device in a low-speed traveling mode.

First, in step S1 of FIG. 7, the low-speed traveling mode transition determination portion 156 determines whether or not the vehicle is currently in the low-speed traveling mode. The determination is made according to whether or not the low-speed traveling mode flag 166 is set to "1."

If the vehicle is not in the low-speed traveling mode, the processing proceeds to the next step S2, and the low-speed traveling mode transition determination portion 156 determines whether or not the state of the motorcycle 10 satisfies a preset low-speed traveling mode transitioning condition. The low-speed traveling mode transitioning condition is to satisfy all of the following conditions (a-1) to (a-7).

(a-1) The shift motor 114 is inactive
(a-2) The position of the shift drum is in neutral
(a-3) The accelerator position (throttle opening angle) is fully closed
(a-4) The vehicle is in a stopped state
(a-5) The engine speed is in an idle state
(a-6) The brake switch 140 is ON
(a-7) The side stand 64 is retracted If the above low-speed traveling mode transitioning conditions (a-1) to (a-7) are satisfied, the processing proceeds to the next step S3, and the low-speed traveling mode transition determination portion 156 determines whether the forward switch 74 and the reverse switch 72 are operated at the same time.

If the forward switch 74 and the reverse switch 72 are operated at the same time, the processing proceeds to the next step S4, and the low-speed traveling mode is started. That is, the low-speed traveling mode transition determination portion 156 sets the low-speed traveling mode flag 166 to "1."

Thereafter, in step S5, the drum motion controller 164 controls the movement of the shift motor 114 to set the position of the shift drum to the low-speed traveling mode position. With this, one dog d6a on the drive gear m6 engages with the dog hole db in the main shaft-side sprocket mB, and the other dog e4b on the driven gear n4 engages with the dog hole e2 in the driven gear n2.

Meanwhile, if it is determined in step S1 that the vehicle is in the low-speed traveling mode, the processing proceeds to step S6, and the normal traveling mode transition determination portion 158 determines whether not the state of the motorcycle 10 satisfies all of preset first normal traveling mode transitioning conditions (b-1) to (b-5).

(b-1) The shift motor 114 is inactive
(b-2) The position of the shift drum is in the forward position (first gear) or the reverse position
(b-3) The accelerator position (throttle opening angle) is fully closed
(b-4) The vehicle is in a stopped state
(b-5) The brake switch 140 is ON If the above first normal traveling mode transitioning conditions (b-1) to (b-5) are not all satisfied, the processing proceeds to the next step S7, and the normal traveling mode transition determination portion 158 determines whether or not all of second normal traveling mode transitioning conditions (b-6) to (b-8) are satisfied.

(b-6) The engine is in a stopped state
(b-7) The stopping speed is not higher than 5 km/h
(b-8) The side stand 64 is retracted If it is determined in step S6 that all of the first normal traveling mode transitioning conditions (b-1) to (b-5) are satisfied, or it is determined in step S7 that all of the second normal traveling mode transitioning conditions (b-6) to (b-8) are satisfied, the processing proceeds to the next step S8, and the normal traveling mode transition determination portion 158 determines whether the forward switch 74 and the reverse switch 72 are operated at the same time.

If the forward switch 74 and the reverse switch 72 are operated at the same time, the processing proceeds to the next step S9, and the normal traveling mode is started. That is, the normal traveling mode transition determination portion 158 resets the "1" in the low-speed traveling mode flag 166 to "0."

Thereafter, in step S10, the drum motion controller 164 controls the movement of the shift motor 114 to set the position of the shift drum to the neutral position.

Figure 8:
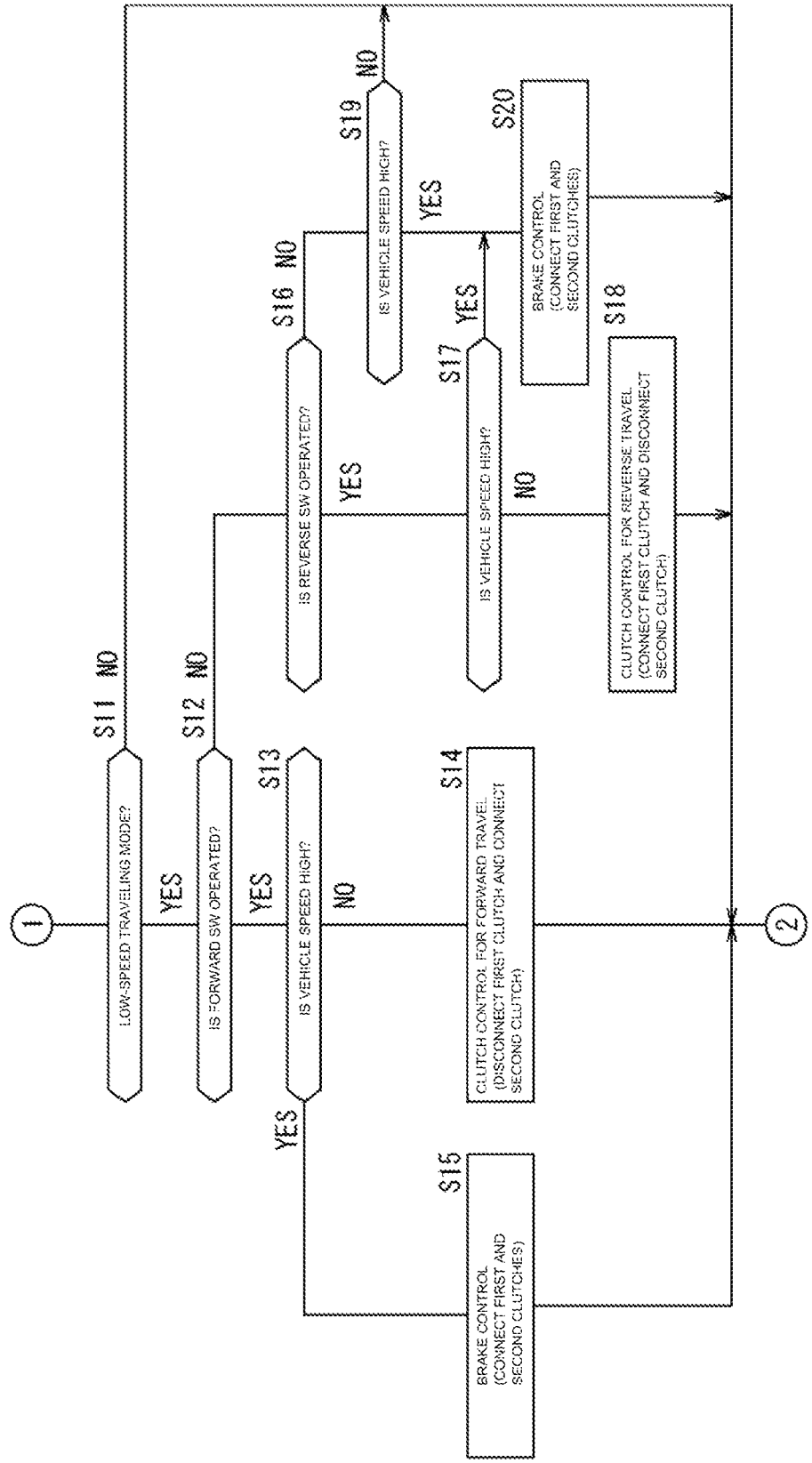
FIG. 8 is a flow chart (No. 2) showing a processing operation of the control device in the low-speed traveling mode.

If the processing in the above step S5 or step S10 is completed, or the low-speed traveling mode transitioning conditions (a-1) to (a-7) are not satisfied in the above step S2, or the second normal traveling mode transitioning conditions (b-6) to (b-8) are not satisfied in step S7, or it is determined in step S3 or step S8 that the forward switch 74 and the reverse switch 72 are not operated at the same time, the processing proceeds to step S11 in FIG. 8.

In step S11, as in the case of the above step S1, the low-speed traveling mode transition determination portion 156 determines whether or not the vehicle is in the low-speed traveling mode.

If the vehicle is in the low-speed traveling mode, the processing proceeds to the next step S12, and the forward-and-reverse clutch oil pressure controller 162 determines whether or not the forward switch 74 is operated.

If the forward switch 74 is operated, in the next step S13, the forward-and-reverse clutch oil pressure controller 162 determines whether or not the vehicle speed is higher than a preset threshold. If it is not, the processing proceeds to the next step S14, and the forward-and-reverse clutch oil pressure controller 162 controls the first solenoid valve 150A and the second solenoid valve 150B to connect the second clutch 108B and disconnect the first clutch 108A. With this, the motorcycle 10 is moved forward at low speed.

Meanwhile, if it is determined in step S13 that the vehicle speed is higher than the threshold, the processing proceeds to step S15, and the forward-and-reverse clutch oil pressure controller 162 controls the first solenoid valve 150A and the second solenoid valve 150B to connect the first clutch 108A in addition to the second clutch 108B. Connection of the first clutch 108A allows rotary force of the crankshaft (force in a rotation direction opposite to the rotation direction of the inner shaft 110i) to be applied to the inner shaft 110i, so that rotary force of the counter shaft 112 can be reduced. Moreover, the forward-and-reverse clutch oil pressure controller 162 performs brake control to reduce the vehicle speed to stopping speed, by controlling oil pressure applied to the first clutch 108A and oil pressure applied to the second clutch 108B.

If it is determined in the above step S12 that the forward switch 74 is not operated, in the next step S16, the forward-and-reverse clutch oil pressure controller 162 determines whether or not the reverse switch 72 is operated.

If the reverse switch 72 is operated, in the next step S17, the forward-and-reverse clutch oil pressure controller 162 determines whether or not the vehicle speed is higher than a preset threshold. If not, the processing proceeds to the next step S18, and the forward-and-reverse clutch oil pressure controller 162 controls the first solenoid valve 150A and the second solenoid valve 150B to connect the first clutch 108A and disconnect the second clutch 108B. With this, the motorcycle 10 is moved rearward at low speed.

Meanwhile, if it is determined in step S17 that the vehicle speed is higher than the threshold, or it is determined in step S16 that the reverse switch 72 is not operated, i.e., neither of the forward switch 74 nor the reverse switch 72 is operated, and in step S19 that the vehicle speed is higher than the threshold, the processing proceeds to step S20, and the forward-and-reverse clutch oil pressure controller 162 controls the first solenoid valve 150A and the second solenoid valve 150B to connect the second clutch 108B in addition to the first clutch 108A. Connection of the second clutch 108B allows rotary force of the crankshaft (force in a rotation direction opposite to the rotation direction of the outer shaft 110o) to be applied to the outer shaft 110o, so that rotary force of the counter shaft 112 can be reduced. Moreover, the forward-and-reverse clutch oil pressure controller 162 performs brake control to reduce the vehicle speed to stopping speed, by controlling oil pressure applied to the first clutch 108A and oil pressure applied to the second clutch 108B.

If the processing in the above step S14, step S15, step S18, or step S20 is completed, or it is determined in step S11 that the vehicle is not in the low-speed traveling mode, or it is determined in step S19 that the vehicle speed is not higher than the threshold, the processing proceeds to step S21 of FIG. 9.

The processing of the flowchart in FIG. 9 is a characteristic function of the embodiment (characteristic processing of the control device 106).

To be specific, in the normal traveling mode of the motorcycle 10, driving torque (output torque) according to the rotation of the engine 100 is transmitted to the rear wheel 44 from the crankshaft of the engine 100, through the clutch device 108, the transmission 40, and the drive shaft. In this case, the rider can sense torque easily since driving torque varies according to the rotation.

Meanwhile, in the low-speed traveling mode, oil pressure of oil 132 fed to the first clutch 108A and the second clutch 108B is reduced, since the forward or reverse movement is carried out at low speed. As a result, it is difficult for the rider to feel variation in driving torque. This leads to a problem that the rider feels strange, since he/she is less likely to sense torque in the low-speed traveling mode even though the engine is rotating, as compared to the normal traveling mode.

Against this background, in the embodiment, the control device 106 performs the processing of the flowchart in FIG. 9, so that the rider can sense torque in the low-speed traveling mode.

First, in step S21, as in the case of the above steps S1 and S11, the low-speed traveling mode transition determination portion 156 determines whether or not the vehicle is in the low-speed traveling mode.

If the vehicle is in the low-speed traveling mode, the processing proceeds to the next step S22, and the forward-and-reverse clutch oil pressure controller 162 determines whether or not clutch oil pressure is controlled for forward or reverse travel.

If the clutch is controlled for forward or reverse travel, the processing proceeds to the next step S23, and the forward-and-reverse clutch oil pressure controller 162 determines, on the basis of vehicle speed information from the vehicle speed calculator 152, whether or not the vehicle speed has stayed within a predetermined vehicle speed range for a predetermined time or longer.

Figure 10A:
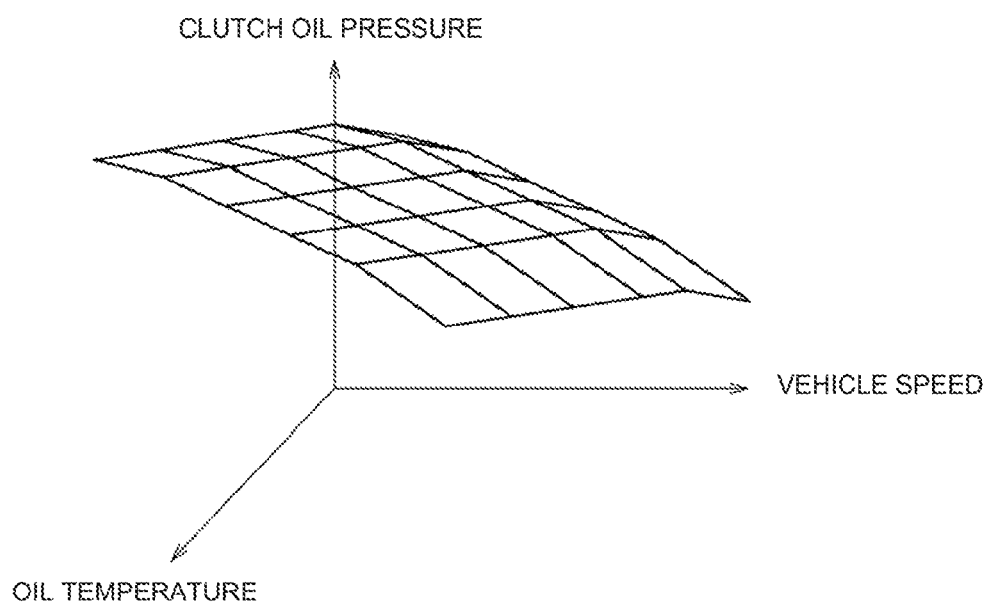
FIG. 10A is an explanatory view of a map of a target oil pressure.

If the vehicle speed is out of the vehicle speed range, or is within the vehicle speed range but the predetermined time has not passed, the processing proceeds to the next step S24, and the forward-and-reverse clutch oil pressure controller 162 determines, on the basis of a map shown in FIG. 10A, a target oil pressure (a target value of oil pressure) of the first clutch 108A or the second clutch 108B according to the temperature of the oil 132 and vehicle speed.

Note that viscosity of the oil 132 increases with lowering of oil temperature. Hence, a lower target oil pressure is set for a lower oil temperature.

Then, the forward-and-reverse clutch oil pressure controller 162 controls oil pressure applied to the first clutch 108A and the second clutch 108B by controlling the first solenoid valve 150A and the second solenoid valve 150B on the basis of the determined target oil pressure, and thereby connects and disconnects the first clutch 108A and the second clutch 108B.

Figure 11:
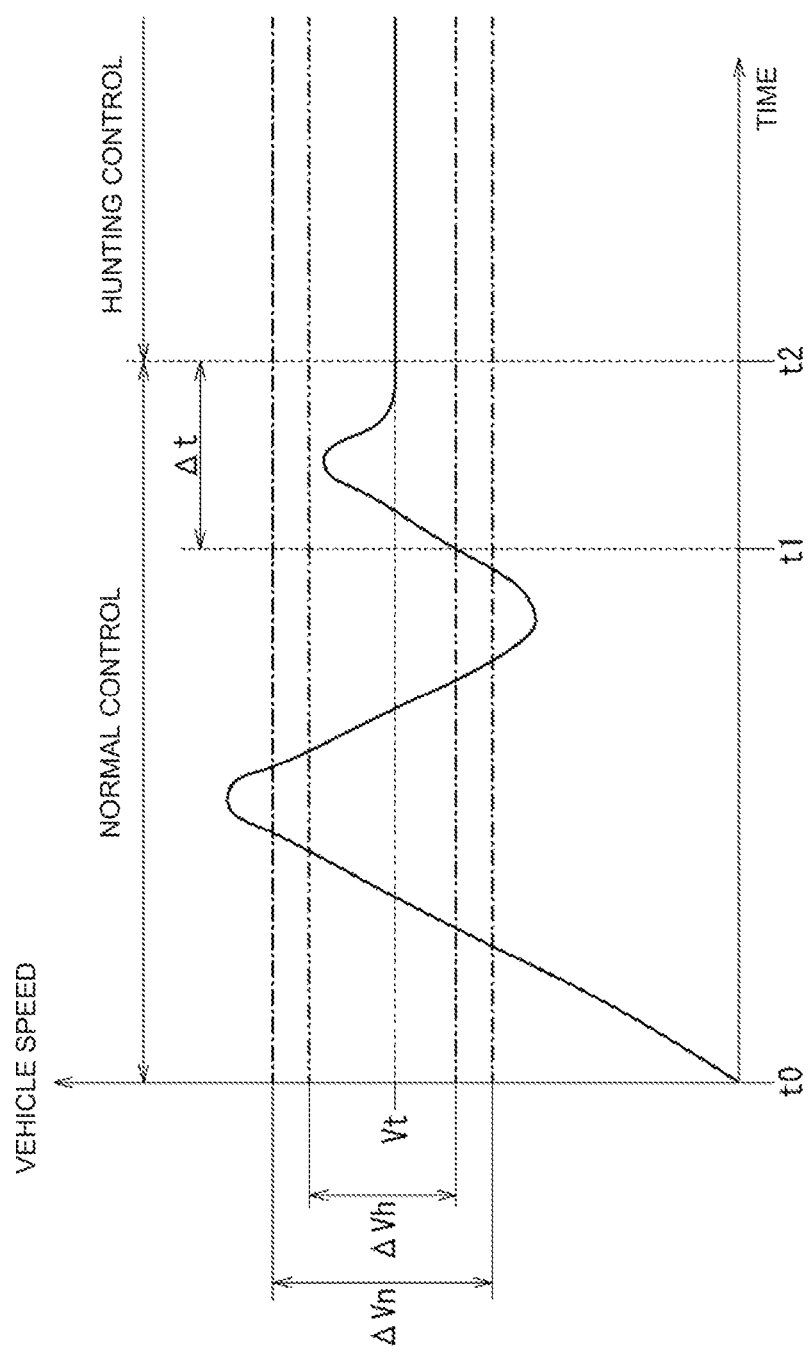
FIG. 11 is a timing chart showing variation in vehicle speed during a transition from normal control to hunting control; and, FIG. 12 is a front view of an example of a seesaw switch.

Specifically, the forward-and-reverse clutch oil pressure controller 162 performs normal control where a sense of torque is not produced, and as in FIG. 11, controls oil pressure of the first clutch 108A and the second clutch 108B to bring the vehicle speed within a first vehicle speed range ΔVn indicated by a dot-and-dash line after a time point t0, for example. Note that FIG. 11 shows how normal control is performed during the time period from the time point t0 to a time point t2, to perform control to bring the vehicle speed within the first vehicle speed range ΔVn.

Meanwhile, in step S23, if a predetermined time passes after the vehicle speed has fallen within the predetermined vehicle speed range, e.g., if a time Δt from a time point t1 to the time point t2 passes after the vehicle speed has fallen within a second vehicle speed range ΔVh, which is set narrower than the first vehicle speed range ΔVn, as in FIG. 11, the forward-and-reverse clutch oil pressure controller 162 proceeds to the next step S25.

Figure 10B:
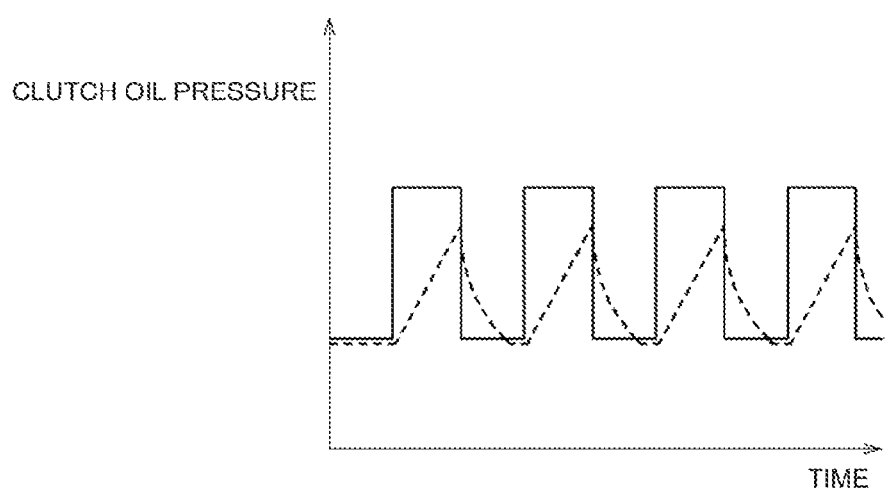
FIG. 10B is a timing chart of an oil pressure correction value added to the target oil pressure.

In step S25, the forward-and-reverse clutch oil pressure controller 162 generates a new target oil pressure, by adding, to the target oil pressure of normal control specified from the map in FIG. 10A, an oil pressure correction value (pulsed oil pressure that increases and decreases for a minute amount repeatedly along with elapse of time) generated repeatedly at constant intervals and indicated by a solid line in FIG. 10B.

Accordingly, after the time point t2 in FIG. 11, the forward-and-reverse clutch oil pressure controller 162 controls oil pressure applied to the first clutch 108A and the second clutch 108B, by controlling the first solenoid valve 150A and the second solenoid valve 150B on the basis of the summed new target oil pressure, and thereby connects and disconnects the first clutch 108A and the second clutch 108B.

Specifically, driving torque transmitted to the rear wheel 44 from the first clutch 108A or the second clutch 108B through the transmission 40 and the drive shaft is varied for a minute amount repeatedly at constant intervals, by performing hunting control where oil pressure of the first clutch 108A and the second clutch 108B is varied for a minute amount repeatedly at constant intervals as in FIG. 10B. As a result, the vehicle speed is maintained at a constant vehicle speed (target vehicle speed) Vt within the second vehicle speed range ΔVh, after the time point t2. Note that in FIG. 10B, the oil pressure correction value added to the target oil pressure is indicated by a solid line, and time variation of actual oil pressure depending on driving torque, which is varied by hunting control, is indicated by a dashed line.

Therefore, the rider can easily sense torque, since hunting control is performed on the driving torque (corresponding oil pressure) in the low-speed traveling mode. Note that as mentioned earlier, the vehicle speed during hunting control is maintained at the target vehicle speed Vt, even when the oil pressure correction value of FIG. 10B is added to the target oil pressure of FIG. 10A, and the first solenoid valve 150A and the second solenoid valve 150B are controlled by use of the summed target oil pressure. That is, the oil pressure correction value is set to such a minute value that the vehicle speed is not affected even when hunting control is performed on the driving torque.

Then, if the processing of step S24 or S25 is performed, or it is determined in step S21 that the vehicle is not in low-speed traveling mode, or the clutch is not controlled for forward or reverse travel in step S22, the processing proceeds to the next step S26, and it is determined whether or not a completion request (request for powering off, maintenance, and the like) for the processing operation of the control device 106 is issued. If there is no completion request, the processing of step S1 and following steps in FIG. 7 is repeated, and at the point when a completion request is issued, the processing operation of the control device 106 is completed.

Thus, according to the embodiment, in the low-speed traveling mode, the forward-and-reverse clutch oil pressure controller 162 of the control device 106 controls oil pressure of the first clutch 108A and the second clutch 108B by controlling the first solenoid valve 150A and the second solenoid valve 150B, and thereby performs hunting control on driving torque, which is transmitted to the rear wheel 44 from the engine 100 through the crankshaft, the first clutch 108A or second clutch 108B, the transmission 40, and the drive shaft. This allows the driving torque to vary for a minute amount repeatedly along with elapse of time, so that a sense of torque can be produced during the low-speed traveling mode. As a result, the rider can sense the torque.

Additionally, in the low-speed traveling mode, the target oil pressure (the target oil pressure determined on the basis of the map in FIG. 10A) used in normal control does not vary over time. Hence, in the embodiment, when performing hunting control, the oil pressure correction value of FIG. 10B is added to the target oil pressure determined on the basis of the map in FIG. 10A. As a result, the summed new target oil pressure is oil pressure that varies for a minute amount repeatedly at constant intervals, and therefore can produce periodical variation in driving torque.

Moreover, the oil pressure correction value of FIG. 10B is set to an amount that does not affect the vehicle speed even when hunting control is performed on the driving torque. Hence, the rider is allowed to sense torque, while the vehicle speed can be maintained at the constant target vehicle speed Vt, during hunting control after the time point t2 in FIG. 11.

Furthermore, as shown in FIG. 11, hunting control is performed on driving torque after the time point t2, if the vehicle speed stays within the second vehicle speed range ΔVh for the time Δt. Accordingly, a sense of torque can be produced stably without frequently switching to and from hunting control.

Figure 12:
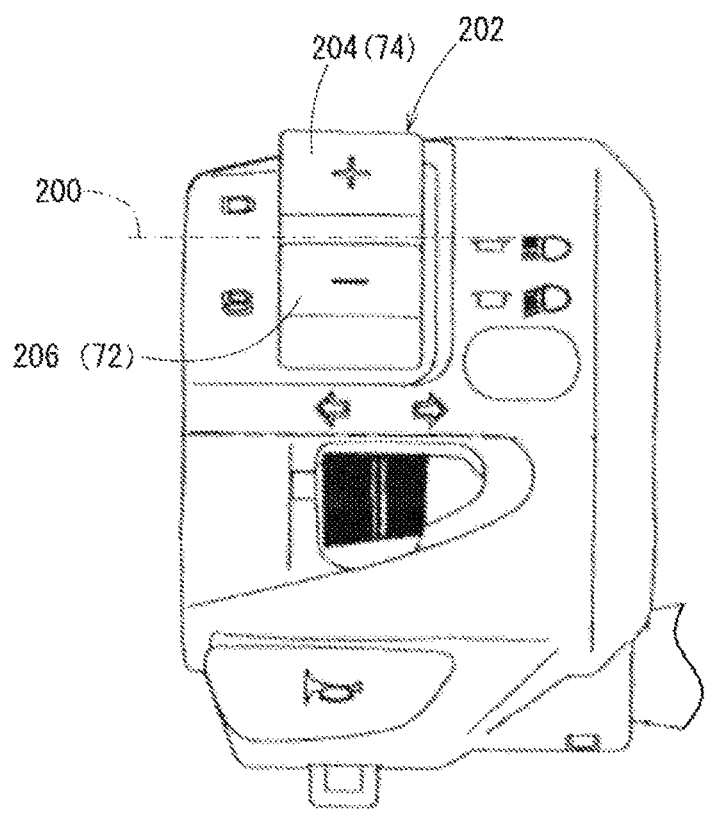

Note that although the aforementioned switch has been described as an example where the forward switch 74 and the reverse switch 72 are installed separately, it may otherwise be configured as a single seesaw switch 202 as in FIG. 12, in which a rotary shaft 200 is installed in a direction perpendicular to the longitudinal direction of the motorcycle 10. In this case, it is preferable that a front operation portion 204 of the seesaw switch 202 be set as the forward switch 74, and a rear operation portion 206 thereof be set as the reverse switch 72. The operation direction of the seesaw switch 202 can be associated with the traveling direction of the motorcycle 10. This configuration intuitively reminds the rider of forward travel and reverse travel, so that erroneous operation can be prevented, and operability can be improved.

In this case, in the normal traveling mode, the operation direction of the seesaw switch 202 can be associated with the gear shift direction by allowing the forward switch 74 to function as the shift up switch, and the reverse switch 72 to function as the shift down switch. Hence, the rider's operability can be improved.

Note that the clutch control device according to the present invention is not limited to the above embodiment, and may be configured in various ways without departing from the gist of the invention, as a matter of course.

DESCRIPTION OF REFERENCE NUMBERS

10 . . . motorcycle (vehicle)
32 . . . left switch case
40 . . . transmission
44 . . . rear wheel
72 . . . shift up switch
74 . . . shift down switch
75 . . . handle switch
100 . . . engine
106 . . . control device (clutch control device)
108 . . . clutch device (clutch)
108A . . . first clutch
108B . . . second clutch
110 . . . main shaft
110i . . . inner shaft
110o . . . outer shaft
111 . . . drive gear train (gear train)
112 . . . counter shaft
113 . . . driven gear train (gear train)
132 . . . oil
150A . . . first solenoid valve
150B . . . second solenoid valve
162 . . . forward-and-reverse clutch oil pressure controller (controller)
174 . . . oil pressure-application system
176 . . . clutch control device
180 . . . reverse gear train
182 . . . reverse travel chain
m1 to m7 . . . drive gear
mB . . . main shaft-side sprocket
n1 to n7 . . . driven gear
nB . . . counter shaft-sides procket

What is claimed is:

1. A clutch control device of a vehicle comprising:
a transmission having a plurality of gear trains between an input-side main shaft and an output-side counter shaft;
a clutch connecting and disconnecting power transmission between said transmission and an engine; and
a controller controlling connection and disconnection of said clutch, wherein
said controller
includes a low-speed traveling mode for performing control to maintain vehicle speed of said vehicle at a target vehicle speed, and
controls said clutch so that hunting, in which output torque outputted to said transmission from said clutch increases and decreases for a minute amount repeatedly, is performed during said low-speed traveling mode.

2. The clutch control device according to claim 1, wherein:
a control amount of said clutch is a target oil pressure; and
said controller causes hunting in said output torque by adding a correction value to said target oil pressure at constant intervals.

3. The clutch control device according to claim 2, wherein said correction value is set to an amount that does not affect said vehicle speed, even when hunting is caused in said output torque.

4. The clutch control device according to claim 1, wherein said controller causes hunting in said output torque, if said vehicle speed stays within a predetermined vehicle speed range for a predetermined time period.

5. The clutch control device according to claim 2, wherein said controller causes hunting in said output torque, if said vehicle speed stays within a predetermined vehicle speed range for a predetermined time period.

6. The clutch control device according to claim 3, wherein said controller causes hunting in said output torque, if said vehicle speed stays within a predetermined vehicle speed range for a predetermined time period.

* * * * *